March 25, 1969     W. H. CLARK ET AL     3,434,187
APPARATUS FOR PACKING AND HARDENING MIXTURES

INVENTORS
WILLIAM H. CLARK
STANLEY A. HALL
BY
ATTORNEYS

United States Patent Office 3,434,187
Patented Mar. 25, 1969

---

3,434,187
APPARATUS FOR PACKING AND HARDENING MIXTURES
William H. Clark and Stanley A. Hall, Salt Lake City, Utah, assignors to Utah Research and Development Co., Inc., Salt Lake City, Utah, a corporation of Utah
Filed July 8, 1966, Ser. No. 563,766
Int. Cl. B28b 7/00, 11/00
U.S. Cl. 25—41          10 Claims

ABSTRACT OF THE DISCLOSURE

Apparatus for hardening mixtures supplied as flowable material supported within a pallet held above a rigid base member carrying a container into which the base of the pallet extends, with a pair of electrodes adapted to have a high voltage supplied thereto extending into the container beneath the pallet so that when an electrical discharge is initiated between them the container holding a liquid which immerses the electrodes produces shock waves and tends rapidly to harden the material within the supporting pallet.

---

This invention relates to apparatus for pulse wave generation.

In the past, various proposals have been made to generate sonic and ultrasonic continuous sinusoidal pressure variations within a body of water. The generated pressures were frequently used to accomplish useful work, such as the cleaning of immersed articles. In some cases large brief electrical discharges in water have been used to create a pressure pulse for the purposes of deforming metal parts. In other instances seismic investigations have been conducted by similar procedures. Efforts were made to adopt these generating methods to various manufacturing processes in the hope of lowering costs, insuring better performance and, in some instances, providing improved commercial appearances of end-products. In general, the power requirements of the past have been large. The problem of producing a sequence of such pulses has not been successfully solved. The present invention provides for generating brief rapidly repeating pulses by which it is possible to utilize the technique of pressure development in a fashion heretofore not possible in the consolidation of materials in containers.

Many and various uses of such types of pulse generation may be considered within the scope and import of the present disclosure. Generated pulse energy as here understood will be regarded as the generation of pulses in what will be termed a "microsonic" frequency image.

The term "microsonic" will be understood to mean a pressure pulse of only a few microseconds' duration which repeats at regular rather closely spaced intervals. By this invention, the microsonic pulses from electrodes immersed in water or other liquid result when a discharge occurs between the electrodes to produce a shell of compressed water travelling outwardly from the discharge spark. The disturbance or outwardly travelling wave has Fourier components of a few hundred kc. per second, but repetition rate is usually only a few cycles per second.

In this general type of work, as heretofore carried on, the main difficulty which arose resulted from the fact that after several discharges through the water gap arc-discharge cannot be generated. Ionic conduction through the water carries off the charge from the condensers without generating a high pressure. Oftentimes, in the past, with such electrode arrangements, it became a customary practice to place to very fine wire between the electrodes to establish the initial arc path through the water gap. After one discharge, the wire distintegrated. Then, in order to maintain discharge through the water, it became necessary to remove the electrodes and insert a new wire, after which, following immersion, another microsonic pulse could be developed. All of this necessitated time consuming details and effectively precluded the generation of continuous microsonic pulses.

In operations where useful work is to be performed, the almost instantaneous discharge betwen electrodes within a water bath produces forces or a compressed waterwave travelling outwardly from the spark in all directions.

In instances where objects are rested at the water surface above the spark discharge, the wave travelling through the water is arrested and its energy is absorbed as it strikes the floating object. By the present invention, recourse is had to such wave absorption coming about as a result of supported objects being in the "strike path" of travel from the arc source of generation. In addition, the electrodes between which discharge is to take place are supported within the water body to extend outwardly from complementarily shaped walls of a support.

The floor below the region in which the electrical discharge in water occurs is constructed of some dense, slightly compressible material, such as steel, which has a high acoustic impedance and therefore effectively reflects the pressure pulse up toward the work piece.

One significant aspect of the invention is that of providing an improved method for precasting an extremely dry concrete mass which improves substantially the compression strength of the final product. Other uses of the invention illustratively are those of providing settling apparatus by which, for instance, loose powder or other similar substances of various compositions may be rapidly settled, compacted, and compressed within any suitable mold or body either directly or through a small entrance port.

In one of its preferred forms, the invention may be practiced by providing a container of any desired size adapted for holding a quantity of water. The container is usually formed with sloping side walls and a flat bottom. A side slope of approximately 45° may usually be considered a limiting value. The limiting condition for container depth is usually approximately half the width of the form or mold which is to be subjected to shock excitation from the produced pressure wave. Electrodes are arranged to extend within the container usually from points along the sloping side walls with the electrodes pointed downwardly toward each other and toward the container bottom.

The slope of the electrodes relative to the surface of the water contained within the container is usually (but not necessarily) less than that of the sloping side walls. The electrodes are normally surrounded, for the greater part of their passage within the water body, by a nonconducting outer shell which is used to insulate and protect them from the surrounding region. The container body itself is normally rested and supported on a metal base or block which covers the entire bottom and which extends at least partially along the sloping side walls. The electrodes penetrating within the water body in the container are normally centered over this metal base. The complete assembly is preferably supported within a framework upon which the side walls of the container and the metal block are held.

The electrical connections are made within tubular insulating shields and then through connecting rods which pass through strong dielectric material and provide a current-carrying path between a pair of discharge points and two electrode tips. The discharge points are rested adjacent to the terminals of a pair of capacitor elements, which are arranged to receive their power from a high voltage direct current source.

In the operation, when the capacitors are fully charged, there is first a discharge across one of the spark gaps. This immediately causes the entire electrical voltage of the previously shared voltage to be accumulated at the air gap between the second capacitor and the second electrode. At this time, the latter gap discharges and applies the full potential of the electrodes across the water gap between the two terminals extending within the container holding the water. The produced discharge takes place through a path provided through the water into which certain fine metallic conducting filamentary masses are inserted in the region of the discharge points.

The arrangement preferred and herein suggested may be considered as operational for and during repeating approximately five microsecond time periods after each discharge initiation. The discharge creates a pulse wave which travels through the medium slightly faster than a sound wave therein.

The circuitry herein to be set forth embodies essentially a resistive path serving to link the two wires from the capacitors, having connections to the positive and the negative sides of the capacitor elements, thereby to deliver substantially instantaneously a charge amounting to a substantial number of watts which is discharged through the spark gap. At this time, the electrical power source converts a relatively low voltage current by the use of suitable transformers. The current is rectified and oriented into two lines, one being positive and the other negative. Storage of the current then occurs until the air gaps again break down and the energy passes on to the water gap. After the capacitors discharge all their stored charge through the water gap, the air gaps again become almost perfect insulators. Then the capacitors charge up from a DC supply in 0.2–0.5 second and are ready to repeat. By the inclusion of the metallic components within the water body within which the discharge electrodes are immersed, discharge can continue under normal operations at a rate of about two discharges per second repeated and repeated until either disconnection is made or until a substantial time period has lapsed, which time period is normally more than that required to perform the desired work by the produced pressure waves.

If this invention is considered as adapted to the hardening of cement or concrete formed from a mixture of the cement, sand, gravel and water composition, a mold, held or supported so as to be at least partially within the water bath, is subjected to the developed pressure pulses which directly strike the mold both directly and after reflection from the side walls of the container and/or the base of the container. The concrete within the mold is soon changed from its initial state of mix into a form which results from what is known as recrystallization. This is generally more or less of a gel-like structure. It comprises a slurry of generally rounded particles formed in a composition which approaches a liquid state initially and then, by rearranging itself into a system of generally long interlocking crystals, forms a rather rigid framework serving to hold the water content in pores. The smaller the water pores, the more effective will be the size in the gel-structure and the stronger will be the cement.

It is known that when ordinary fresh concrete is deformed, it has little tendency to resume its original shape when the force is removed. The flexibility, or tendency to spring back to shape, of concrete which has been consolidated using microsonic pulses is greatly increased over ordinary fresh concrete. Moreover, it has been found that microsonically consolidated concrete is stronger, when fully set, by about 20% than ordinary concrete of the same composition. Moreover, mixing under the effects of the pressure insures a stronger concrete by providing for mixing into the desired form while the concrete is in a substantially drier state.

From the foregoing it will be apparent that among the primary objects of the invention are those of providing a greatly improved apparatus for use for the purpose of hardening concrete and for making possible the use of a concrete mixture having substantially less water content than is normally included than where the mixture has to be made readily workable and handled to a greater extent. Other objects of the invention are those of improving the quality of the end-product and for accelerating the rate at which the mixture sets to a point where its status is substantially finalized, although curing has not been complete. Still further objects are those of providing apparatus whereby improved and substantially stronger precast concrete structures may be provided through the ability to pour a less viscous mixture into a mold or form for setting. Further objects are those of providing greatly improved shaping of the concrete with respect to a mold through the use of electrical and pressure forces not heretofore recognized as helpful in the operation. Another object is that of providing an improved method of interacting the mixing rates of different material solids in powder form in order that in the finalized state they may be properly mixed to form a concrete mass which is extremely hard and which will set prior to its actual curing. Still additional and further objects and advantages of the invention will become apparent from a reading of the following description and claims in conjunction with the accompanying drawings which represent the invention in its preferred form and wherein:

Figure 1:
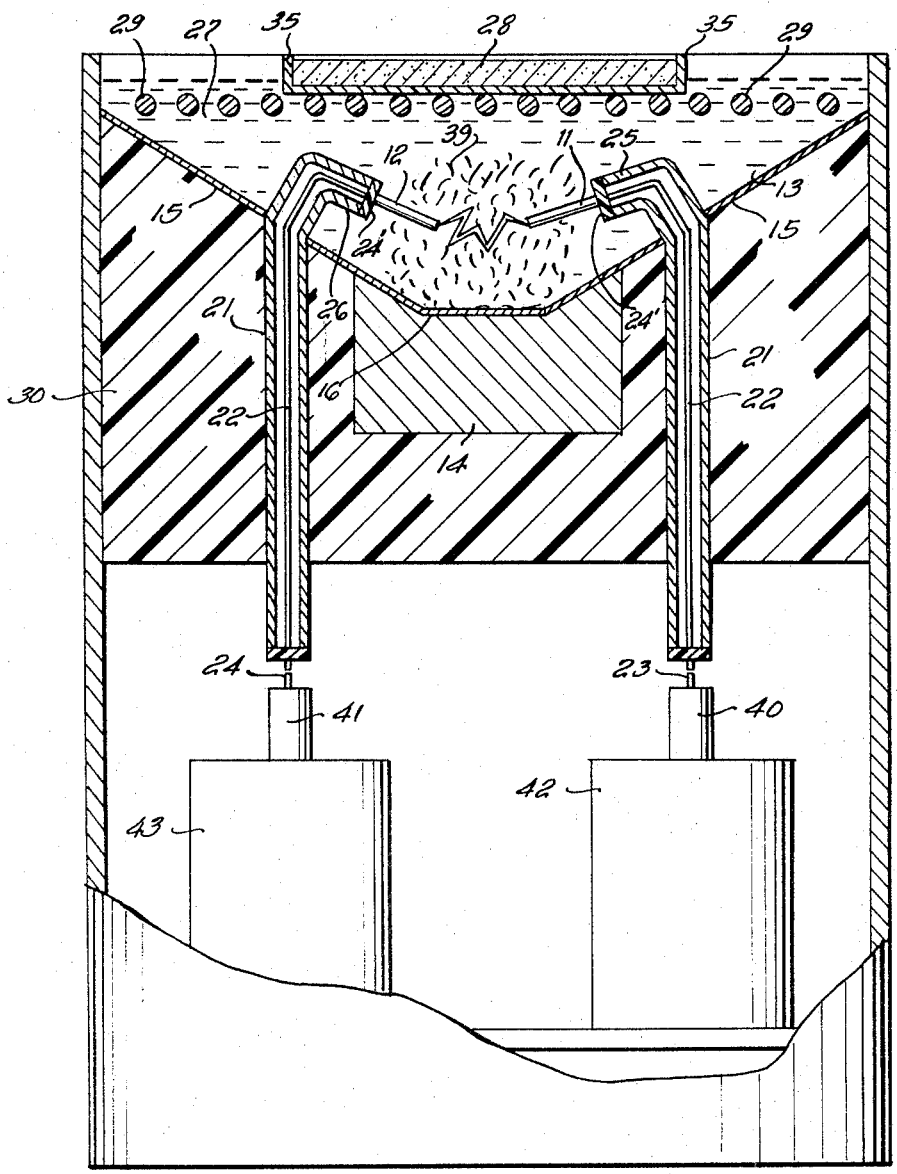
FIG. 1 is a schematic arrangement to show the relative positioning of electrodes, the fluid container and activating source.

Electrode elements 11 and 12 are supported internally of an open top container 13. The container preferably has sloping side walls 15 which merge with a flat bottom portion 16. The assembly is of generaly inverted frustoconical shape. A base member 14 whose upper surface is generally complementary to that of the container bottom forms a rigid support for the container. The base member is formed of a very hard material, which, preferably, is in the form of a steel block rested as indicated by the drawings.

The steel block or base member 14 is of relatively large size and adapted to have the container fitted therein with the sloping side walls 15 terminating in a generally below the block surface flat container bottom 16. The slope of the container walls relative to either the horizontal base or the vertical support is not precisely critical although a slope of 45° to the horizontal base section 16 is approximately the limiting value, as will later be apparent.

The electrode members 11 and 12 normally extend outwardly from the ends of the generally tubular support elements 21. These supports may be ordinary steel pipe within which an electrical connection (schematically illustrated at 22) is held in insulating fashion. The connection 22 is made through a base contact 23 or 24 at the lower end of the tubular member. The upper end of the tubular member 21 protrudes through the side wall of the container 13 and is bent or turned inwardly, as generally indicated, so that the electrode members 11 and 12 protruding from insulating bushings 24' have their ends 25 and 26 pointing downwardly toward the container base and form an angle of approximately 30° relative thereto.

The ends of the electrodes 11 and 12 are brought reasonably close to each other at their outer tips, for instance, within a range of about two inches or less even for high voltage operation. Thus, when a high potential is applied across the electrode elements, spark discharge may take place between the electrode tips.

Figure 3:
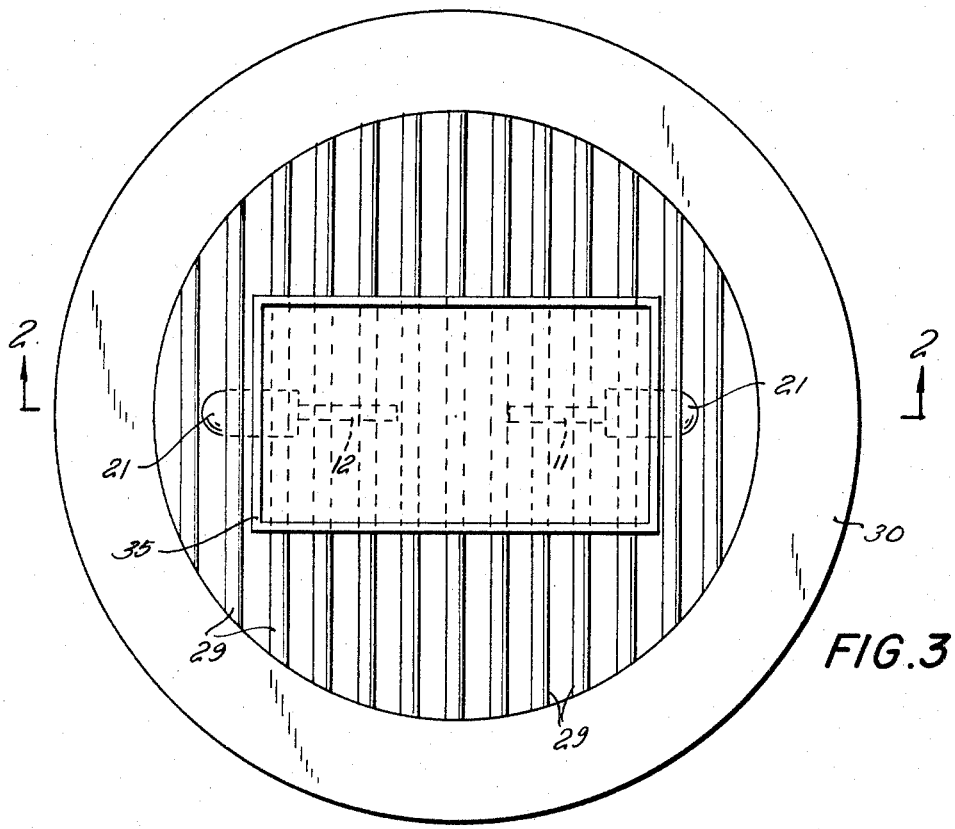
FIG. 3 is a schematic plan view of the support structure designated by FIG. 2.

The container 13 is normally filled with water 27 which extends to a depth sufficient to cover completely the electrodes 11 and 12 and also to contact and cover the grill members 29 (see FIGS. 2 and 3) which are adapted to support a pallet 35 (see FIG. 2) upon which the work is supported. The grill is usually formed of rods. In one preferred device the rods were of about one-half inch diameter and spaced about four inches apart center-to-center.

The assembly of the steel shell container 13 and the tubular members 21 containing the discharge electrodes and the steel support block or sonic reflector 14 is preferably within a relatively rigid but insulating type packing 30 which is preferably made from an epoxy resin with which suitable additional insulating material is mixed. The particular composition of this insulating material may be varied within wide limits since this is not specific to the invention so long as the materials all have insulating properties and are sufficiently rigid to support the described elements. Suffice it to say that the assembly of the electrodes and their mountings may be embedded in the packing and with hardening of the epoxy substances shall be rigidly supported.

Figure 2:
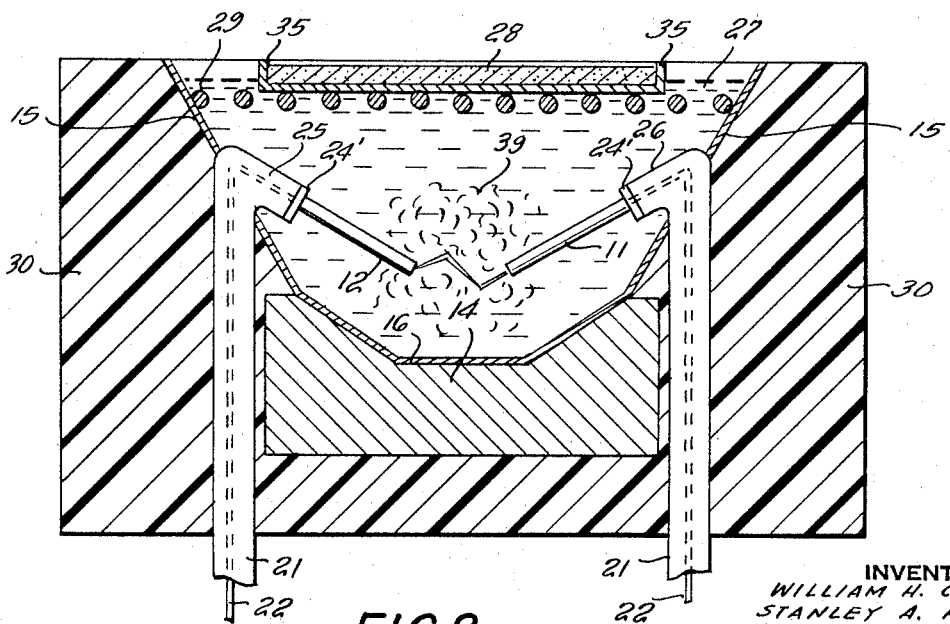
FIG. 2 is a schematic elevation cross-sectional view taken approximately on the line 2—2 of FIG. 3 to indicate the relative positioning of the electrodes within the electrode-immersing bath and the support for the pallet upon which the mold for carrying the mixture is supported.

As can be seen from FIG. 2 in particular, the grill members 29 may be carried in any desired fashion from the side wall or top of the container. It is important that this support be rigid enough to support the work piece and that the grill in its supported plane should be positioned somewhat below the top peripheral edge of the container in order to be immersed in the liquid bath. If so arranged, the container 13 may be filled with a liquid, such as water, which is carried to a level to immerse completely the electrode elements 11 and 12 and cover substantially also the grill members 29. At this time, a pallet 35 is rested upon the upper surface of the grill members or rods 29 and permitted to be in contact with the water filling the container and immersing the electrode elements 11 and 12. The rods are sufficiently strong to support the weight of the pallet and contents. Alternatively, under some conditions the grill may be removed and the pallet on which the articles to be treated are carried can be floated on the water bath and laterally positioned to be held above the electrode elements 11 and 12.

Figure 5:
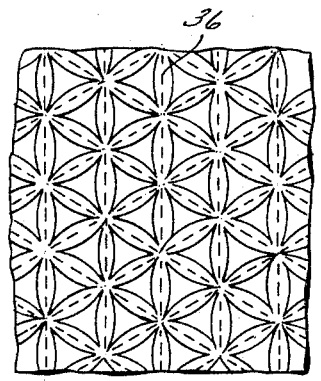
FIG. 5 is a plan view of an illustrative mold for receiving the concrete mix and for being subjected to the pressure activations developed by the charging circuitry of FIG. 4 and effective upon the discharge electrodes.

As can be seen particularly from FIG. 5, if the grill supports a pallet, the pallet may be provided with an intaglio on its bottom inside surface, as represented schematically by the assumed design 35, as in FIG. 5. In practicing the method herein set forth with apparatus of the type here described, the pallet or mold is filled prior to excitation by developed pressure waves with a mixture 28 of cement, gravel, water and sand. It is important that this mixture be as dry as possible, due to the fact that the drier the mix, the more strength is imparted to it upon hardening, as already mentioned. In this regard, it is preferable that the water content be in the range from about 0.35 to about 0.5 as compared to unity for cement, with an approach to 0.4 generally being preferable. The mold is filled to the desired depth with such a mix, as represented schematically at 28. Following the filling, high voltage adequate to produce discharge between the electrodes 11 and 12 is applied, as will later be discussed.

The electrodes 11 and 12 are immersed in the water bath and an initial discharge occurs between them through the water medium. This discharge is normally followed by two or three more discharges, after which the discharge normally ceases and the water seems to improve its dielectric properties and a low resistance arc no longer forms. Under the desired circumstances, the discharge is to be created each time the potential between the discharge electrodes reaches a critical value. This discharge (when it occurs) persists for a period of about 5 microseconds after which it is interrupted, almost all the energy stored on the capacitors being by that time dissipated.

However, in practicing the invention herein set forth, prior to the application of the high voltage between the discharge electrodes 11 and 12, there is inserted into the water bath filling the container, and covering the electrodes and extending within the container to a depth sufficient to cover the grill members 29 and to contact in pallet placed therein a mass of electrically conducting threads 39. These electrically conducting threads are introduced into the water bath in the region of the discharge electrodes and provide, through the very fine nature of the threads, more or less floating particles through which continued discharge of about the named duration and selectively spaced occurs.

With the introduction of the extremely fine electrically conducting threads into the water bath, electrical discharge between the points is promptly initiated and continually repeated electrical discharges occur for time periods adequate to make an initial setting of the cement or concrete mixture assumed to be applied to the pallet and rested upon the grill members.

In the operation and in the course of discharge, the discharge wave force created by the discharge between the electrode elements produces within the liquid a pressure wave directed upwardly toward the grill members and any pallet held or supported thereby. At the same time, pressure waves are also produced and passed downward and in lateral direction as can be seen from the diagram of FIG. 2. Because of the hard steel block bottom surface 16, and the wave-reflecting side walls the waves starting in a downward path are reflected upwardly toward the grill members. Similarly, other pressure waves extending laterally are reflected by the sloping sides of the container thereby also eventually to be directed upwardly toward the grill members and the supported pallet. Pressure waves which reach the grill members directly may be reflected downwardly again toward the container bottom or side walls and again reflected to impact the supported material. The result is that it is believed through shock effects and the like, the material contained within the pallet is forced downwardly into the mold and there caused effectively to be "worked" much as would be the case were it to be packed into the mold. The end result is that there is a rapid hardening of the material and, after a limited amount of such shock treatment, the mold may be removed from the grill and the set product therein removed.

Figure 4:
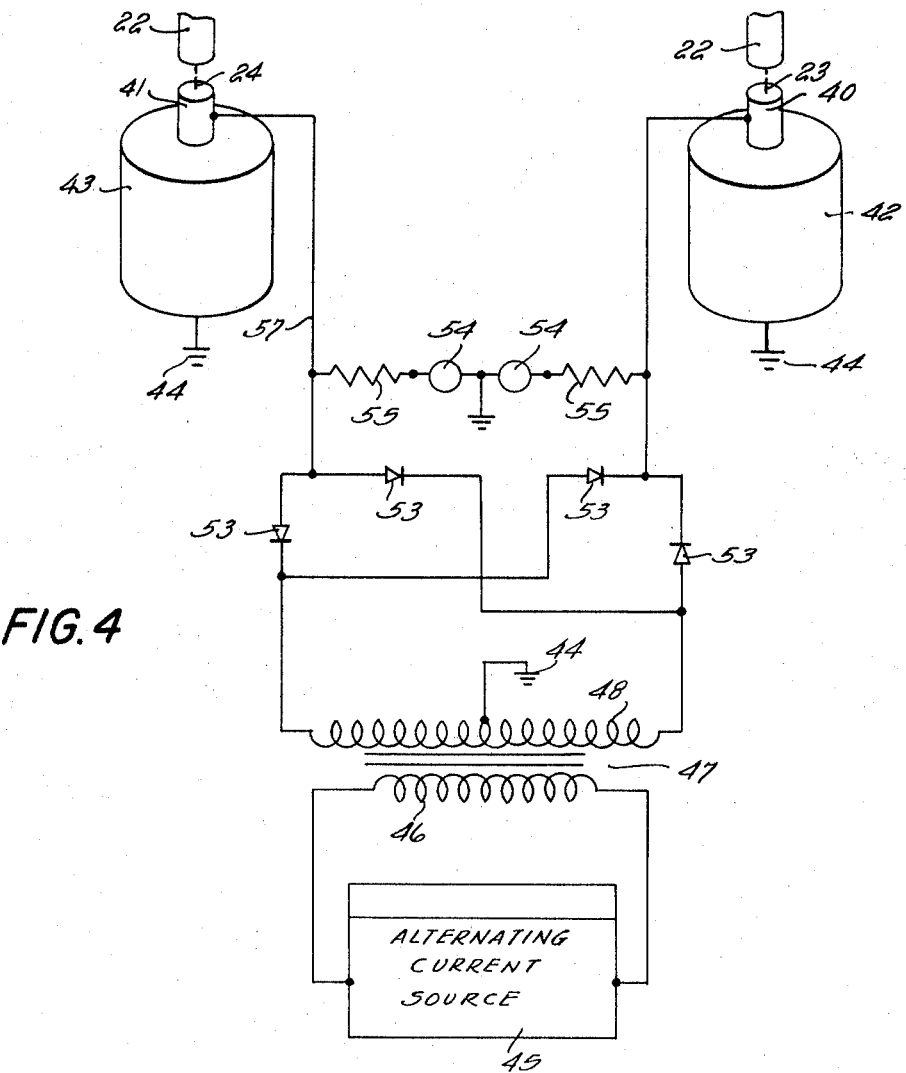
FIG. 4 is a conventional circuit diagram to illustrate the condenser system for producing charging pulses for the discharge electrodes.

Various forms of circuitry to provide the high voltage required for discharge may be utilized. One form has been shown illustratively by FIG. 4 where the lower ends of the conductors 22 contained within the tubular members 21 terminate beneath the described epoxy and fiberglass packing or filling 30. These conductors terminate substantially adjacent to conductor members 40 and 41, which, in turn, are the electrode members of a pair of capacitors 42 and 43. The other connecting terminal of the capacitors is grounded at 44. In order to build up a high voltage relative to ground within the capacitors 42 and 43 a rectifier arrangement is provided for changing them.

In this arrangement, a relatively low voltage source (schematically shown at 45) of alternating current is schematically represented. This source supplies its output to the primary winding 46 of a transformer 47 thereby to energize the secondary winding 48. The secondary winding 48 is center tapped to ground 44 in any desired fashion.

Rectifier elements conventionally represented at 53 are cross-connected, as desired, and are connected from the outer ends of the transformer secondary 48 to charge the condensers or capaictors 42 and 43 relative to ground. The energy is stored until the air gaps between the ends of the electrical connections 22 and the conductors 40 and 41 leading out from the capacitor permit the passage of energy therebetween. An air gap in an electrical circuit has the property that it is an almost perfect insulator until the applied voltage reaches some high value, after which an arc forms and the gap becomes an almost perfect conductor. The gaps between the electrodes 40 and 22 or 41 and 22 are air and, since the dielectric characteristic of air gaps is well known, the firing voltage can be adjusted to some particular preselected and preset value.

The charging is observed by the indicators or meters 54 which connect through resistor elements 55 and 55' to leads 56 and 57 which serve to charge the capacitors 42 and 43. The charging of the capacitors is such that substantial energy is built up and passed through the electrical connections 22 (after discharge of the capacitors 42 and 43) so that a very substantial amount of energy is delivered to the electrodes 11 and 12. Without attempting in any respect to limit the disclosure, it may be stated that the connections are such that they provide an instantaneous energy output at the discharge electrodes 11 and 12 which is in the range of about $4 \times 10^8$ watts per second. It is, of course, to be understood that this represents peak power and resultant peak pressure with discharge from the electrodes. Also, it is to be recalled that the time duration of discharge between the electrodes 11 and 12 is extremely short, being in the order of $10^{-5}$ seconds duration. Thus, while the peak power is substantial, the average power is comparatively low. The result is that pressure wave excitation occurs within the liquid in the container and the pressure waves, either directly through the liquid within the container or, as reflected, strike the pallet. The operation is such that there is a shock effect manifested at the pallet which tends to have a compressive action. When it is borne in mind that the concrete mix has thixotropic properties, which infers that it is solid under small forces even when freshly mixed but that it will flow under large forces. The importance is evident. Under the circumstances, cavities which would otherwise be present in the filling tend to collapse under the repeated shocks and bring about a hardening and a molding of the contained product.

In alternative forms, if solids are being forced into the enclosed vessel, the peak pressure effective on the pallet in which the vessel is supported is high. It is possible to expedite the filling of the vessel and to increase substantially the quantity of the filling due to the compaction which results.

In cases where the concrete is hardened in the mold and pallet the mold is removed from the grill after the desired period of pulse excitation. The hardened (or semi-hardened) and mold-shaped material is then removed in any desired fashion, after which the operation is continued.

Various modifications may be made within the spirit and scope of this invention without in any way departing from the principles here described.

Having now described the invention what is claimed is:

1. Apparatus for packing and hardening mixtures supplied as flowable material and imparting strength to the end-product comprising:
    a container having a working area of generally flattened bottom and sloping side walls and adapted for containing a liquid therein,
    a pair of electrode elements supported to extend within the container and to approach each other in the region above the flattened container bottom,
    means supporting the electrode members,
    a base member having an upper surface generally complementary to said container bottom and lower side walls and having an acoustic impedance comparable to steel constituting a rigid support for the container bottom as well as the lower portion of the side walls,
    means to supply a high voltage between the electrode elements for initiating an electrical discharge therebetween,
    a support means in the upper portion of the container adapted for holding a pallet mold within an unhardened mixture is adapted to be placed for molding, the liquid filling depth which the container holds being sufficient to immerse the electrodes and to contact at least the under surface of the pallet carrying the unhardened mixture, and
    means supporting the container upper side walls and the base member and said electrode supporting means 2. The apparatus claimed in claim 1 wherein the discharge electrodes are positioned substantially above the base member and at an angle less than that of the container side wall relative to the base.

3. The apparatus claimed in claim 1 wherein there is included said means for supporting the side walls and the base member being a plastic filling in the means beneath the container walls for embedding the container walls and bottom, the supporting base member and the electrodes.

4. The apparatus claimed in claim 3 comprising, in addition, said electrode support means including shielded means included within the plastic filling through which high voltage is adapted to be supplied to the electrodes.

5. Apparatus for packing and hardening mixtures supplied as flowable material and imparting strength to the end-product comprising
    a container having a working area of generally flattened bottom and sloping side walls,
    a pair of electrode elements supported to extend within the container and to approach each other in the region above the flattened container bottom,
    means supporting the electrode members,
    a base member having an upper surface generally complementary to said container bottom and lower side walls and having an acoustic impedance comparable to steel constituting a rigid support for the container bottom as well as the lower portion of the side walls,
    means to supply a high voltage between the electrode elements for initiating an electrical discharge therebetween,
    a support means in the upper portion of the container adapted for holding a pallet mold within which an unhardened mixture is adapted to be placed for molding, the liquid filling depth which the container holds being sufficient to immerse the electrodes and to contact at least the under surface of the pallet carrying the unhardened mixture,
    means supporting the container upper side walls and the base member and said electrode supporting means,
    a liquid filling within the container to a depth at least to cover the pallet support means, and
    a multiplicity of conducting strands within the liquid contained in the container whereby improved reflectance of wave energy developed with the initiating of the electrical discharge between the electrodes is improved.

6. The apparatus claimed in claim 1 comprising, in addition,
    a pair of capacitor means, and
    means for inducing the high voltage from the capacitors upon the high voltage electrode elements.

7. The apparatus claimed in claim 1 comprising, in addition, means to control the discharge of electrical energy between the discharge means to produce pulses of a duration of the order of 5 to 10 microseconds repeating at a rate of the order of 5 to 10 cycles per second.

8. The apparatus claimed in claim 1 wherein the distance between the bottom of the pallet mold upon which the unhardened mixture is adapted to be supported and the container bottom is at least equal to one-half the longest dimension of the supported pallet.

9. The apparatus claimed in claim 1 wherein the maximum slope angle of the sloping side walls relative to the container bottom is of the order of 45°.

10. The apparatus claimed in claim 1 wherein the support means is a grill for the support of the mixture-carrying pallet mold, said grill being spaced from the container bottom by a distance of at least one-half its longest dimension.

References Cited

UNITED STATES PATENTS 3,149,372   9/1964   Stringer _____ 18—5
3,167,043   1/1965   Furth.

FOREIGN PATENTS 1,310,685   10/1962   France.

J. SPENCER OVERHOLSER, *Primary Examiner.*

R. D. BALDWIN, *Assistant Examiner.*

U.S. Cl. X.R.

18—5; 164—250; 264—71